United States Patent [19]

Muller

[11] 4,329,264
[45] May 11, 1982

[54] BALLPOINT WRITING INSTRUMENT CONTAINING AN INITIALLY ERASABLE INK

[75] Inventor: Frank A. Muller, Los Angeles, Calif.

[73] Assignee: Scripto, Inc., Doraville, Ga.

[21] Appl. No.: 136,787

[22] Filed: Apr. 3, 1980

[51] Int. Cl.$^3$ .............................................. C08K 5/01
[52] U.S. Cl. .................................... 523/162; 401/17; 401/18; 401/21; 401/34; 524/491; 524/322
[58] Field of Search ................ 260/23.7 M, 33.6 A, 260/33.6 AQ, 33.6 PQ, DIG. 38; 106/22, 23, 27, 28, 29, 30, 32; 401/17, 18, 21, 34

[56] References Cited

U.S. PATENT DOCUMENTS

| | | | |
|---|---|---|---|
| 2,325,297 | 7/1943 | Barmeier | 260/33.6 A |
| 2,715,388 | 8/1955 | Cofield et al. | 120/42.4 |
| 2,833,736 | 5/1958 | Glaser | 260/29.6 |
| 2,852,397 | 9/1958 | Goessling | 106/31 |
| 2,852,398 | 9/1958 | Goessling | 106/31 |
| 2,853,972 | 9/1958 | Cofield | 120/42.4 |
| 3,423,215 | 1/1969 | Gerhardt | 260/33.6 PQ |
| 3,553,710 | 1/1971 | Lloyd | 346/21 |
| 3,563,782 | 2/1971 | Liberman et al. | 117/37 |
| 3,834,823 | 9/1974 | Seregely et al. | 401/198 |
| 3,875,105 | 4/1975 | Daugherty | 260/33.2 R |
| 3,912,520 | 10/1975 | Miyajma et al. | 106/22 |
| 3,993,492 | 11/1976 | Woolly | 106/19 |
| 4,028,119 | 6/1977 | Yamada | 106/27 |
| 4,097,290 | 6/1978 | Muller | 106/30 |

*Primary Examiner*—Paul R. Michl
*Attorney, Agent, or Firm*—Newton, Hopkins & Ormsby

[57] ABSTRACT

A ballpoint writing instrument containing a supply of ink capable of producing an intense colored line when deposited on a writing paper surface that is capable of erasure within several hours after deposit by the use of a conventional pencil eraser without causing damage to the writing paper surface but which thereafter sets up to produce a permanent non-erasable line. The ink includes an elastomeric polymer such as Cis-1.4 Polyisoprene dissolved in an essentially non-volatile hydrocarbon solvent or plasticizer such as a light mineral oil and a colorant such as pigment particles evenly dispersed in the plasticized elastomeric polymer solution. The elastomeric polymer prevents the pigment colorant from penetrating into the writing paper surface. The preferred ink formulations also avoid or limit the use of volatile solvents which are detrimental to smooth writing characteristics for a ballpoint pen.

9 Claims, No Drawings

BALLPOINT WRITING INSTRUMENT CONTAINING AN INITIALLY ERASABLE INK

BACKGROUND OF THE INVENTION

1. Field of the Invention

The present invention pertains to a truly erasable writing medium that can be satisfactorily dispensed through a ballpoint writing instrument to give a mark that can be removed from the writing surface with comparative ease by the use of a substantially non-abrasive eraser within the first few hours after being applied to the writing surface but which thereafter sets up to produce a permanent non-erasable line.

2. Description of the Prior Art

Many frequently interrelated factors must be taken into account in the formulation of a writing medium. These factors fall into two categories, namely, those which stem from the type writing instruments to be used in dispensing the writing medium onto the writing surface, and those which are concerned with the desired characteristics that the writing medium possesses after being dispensed.

Writing instruments available to the formulator of a writing medium include ballpoint pens, variations of the so-called soft or porous-type pens, and fountain pens. In some instances, such as is the case with lead pencils or crayons, the writing medium itself is in effect the dispensing means.

Insofar as the characteristics of the writing medium in the "after dispensed" state are concerned, appearance and relative indelibility are the most important. In most cases, the appearance of the writing medium means little more than the color of the written line. Indelibility is related to the ease of removal of the written line. Thus, an indelible writing medium is one which is resistant to removal from the writing surface. Obtainment of a high degree of indelibility is not always necessarily desirable. In some instances one may want a writing medium which is not easily removable by mechanical means from the writing surface, while in other instances one may want a writing medium which is easily removable. A writing medium having this latter attribute is generally referred to as "erasable" writing medium, and if such a medium is to be considered as being truly erasable, it must be readily removable from the substratum from which it has been applied without any damage of any significant degree to the area of the substratum involved.

In order to understand the nature of this invention, consideration must first be given to the conditions which the formulator of an erasable writing medium must avoid. This in turn requires at least an elementary knowledge of the structure of paper, since paper is the substratum most commonly employed as a writing surface.

Paper is essentially a mat of randomly oriented cellulose fibers. Thus, paper consists of solid structural members, namely the cellulose fibers, having numerous minute voids therebetween. From this description, it may readily be seen that the formulator or designer of an erasable writing medium must prevent the colorant portion of the medium from penetrating to any substantial degree into the voids in the surface being written upon because if there is substantial penetration into the voids the subsequent removal of the colorant by mechanical means can not be accomplished without damage to the writing surface. Likewise, it may readily be seen that for a writing medium to be erasable, the colorant particles must be prevented from affixing themselves with any substantial degree of permanence, either by chemical reaction or as a result of mere physical attraction, to the solid members of the paper substratum.

In the past, attempts to achieve a truly erasable writing medium for a ballpoint pen usually have been unsuccessful. These attempts have employed two somewhat overlapping approaches to solving this problem.

In one approach, reliance has been placed upon the ability of a superabrasive eraser to remove ordinary ball pen inks from the paper substratum normally used for writing purposes. As discussed above, such substratum is porous to some degree and the ball pen inks in ordinary usage tend to penetrate those pores. In addition, the colorants in such inks tend to affix themselves to the fibers which constitute the solid portion of the substratum. Therefore, the only way to erase markings made with ordinary ball pen inks is to physically remove a substantial number of the fibers in the vicinity of the markings. As a result, the paper substratum is generally so damaged during the erasure process that it is rendered unsuitable for any further use as a writing surface.

In the other approach to an erasable writing medium, attempts were made to modify the ink so as to prevent the colorant portion thereof from penetrating the pores of the paper substratum. These attempts consisted of substituting pigment-type colorants for the dye-type colorants usually used in ball pen inks. The reasoning behind this approach was that since pigment-type colorants normally have a greater particle size than dye-type colorants, the pigment-type colorants would become substantially immobile upon being deposited upon the surface of the paper substratum and, therefore, would not tend to penetrate into the pores of the paper. However, this line of reasoning overlooked the fact that in a ballpoint writing instrument, the ink is dispensed through a very minute clearance between the ball and socket and that any pigment-type particle which is small enough to be so dispensed will tend to behave as if it were a dye-type particle. Therefore, the colorant portion of such inks was not immobilized to any significant degree and as a consequence, no substantial advantage was gained through substituting the pigment-type colorant for the dye-type colorant insofar as erasability was concerned.

Some success has been achieved in producing erasable ballpoint pen inks that are transitorially erasable, for example, my prior U.S. Pat. No. 4,097,209 hereinafter referred to as Muller et al. and U.S. Pat. No. 3,875,105 to Daugherty et al. Both of these patents teach the use of an elastomer. The Daugherty et al. patent teaches polyvinyl methyl ether and the parent application thereof, Ser. No. 751,759, now abandoned, teaches cis polyisoprene and Natsyn 2200 while my prior Muller et al. patent teaches natural rubber or rubber which essentially duplicates the chemical structure of natural rubber. Both patents disclose the use of a volatile solvent. Daugherty et al. discloses the volatilizing component as being a solvent for the matrix and having an evaporation rate of 3 to 15 on a relative numerical scale on which ethyl ether is assigned an evaporation rate of 1. My prior Muller et al. patent discloses a volatile low boiling organic solvent having a boiling point less than 180° C. and exhibiting 100% evaporation within 60 minutes. In summary, both my prior Muller et al. patent and the Daugherty et al. patent taught an erasable ink that included the following: (1) the use of a pigment as a colorant; (2) a rubber type elastomer polymer; and (3) the use of mixtures of volatile and non-volatile solvents.

It now has been found that the inclusion of a volatile solvent in a ballpoint pen ink is highly undesirable. For example, during the production of an ink containing a volatile solvent it must be produced in sealed mixing equipment and also it is detrimental to the smooth writing quality expected from a ballpoint pen ink because its presence produces a thick ink "build-up" on the point and also contributes to a dry writing unit that does not have ease of application.

The below-listed prior United States patents are made of record herein under 37 C.F.R. 1.56:

| | |
|---|---|
| 2,715,388 | Cofield et al. |
| 2,833,736 | Glaser |
| 2,852,397 | Goessling |
| 2,852,398 | Goessling |
| 2,853,972 | Cofield |
| 3,553,710 | Lloyd |
| 3,563,782 | Liberman et al. |
| 3,834,823 | Seregely et al. |
| 3,875,105 | Daugherty et al. |
| 3,912,520 | Miyajima et al. |
| 3,993,492 | Woolly |
| 4,097,290 | Muller et al. |

SUMMARY OF THE INVENTION

The present invention relates to a ballpoint writing instrument containing a supply of ink capable of producing an intense colored line when deposited on a writing paper surface which is capable of erasure within several hours after deposit by the use of a conventional pencil eraser without causing damage to the writing paper surface but which thereafter sets up to produce a permanent non-erasable line. The ink consists essentially of an elastomeric polymer such as Cis-1.4 Polyisoprene or Natsyn 2200 present in an amount between 20 and 36% by weight dissolved in an essentially non-volatile hydrocarbon solvent or plasticizer such as light mineral oil present in an amount between 36 to 68% by weight and a colorant such as pigment particles present in the amount of 12 to 26% by weight evenly disbursed in the plasticized elastomeric polymer solution.

The elastomeric polymer usually has an average molecular weight between 500,000 and 1,000,000 while the non-volatile hydrocarbon solvent has a boiling point between 180° C. and 290° C. and a viscosity essentially of 1.5 centipoise at 20° C. The pigment particles size is established as 5 microns or less.

The ink may also include a lubricant in the form of a fatty acid such as oleic, steric or lauric acid present in an amount of 6% or less by weight.

While it is preferred to eliminate the presence of any low boiling volatile solvents, in some cases a minimal amount may be utilized provided it is limited to an amount of 9% or less by weight so that any decrease in writing quality is minimized.

The inks of the present invention are such that they lend themselves to being used in a pressurized ink cartridge in that they have an apparent viscosity between 1,000,000 and 4,000,000 centipoise.

Therefore, it is an object of the present invention to produce an ink that is initially erasable but which sets up to produce a permanent non-erasable line within 10 to 12 hours after being deposited onto the writing paper surface.

It is a further object of the invention to produce an ink that is free of any volatile solvent or one where the use of a volatile solvent is present in a very limited amount so as to keep any decrease in writing quality to a minimum.

It is also an object of the present invention to produce an ink that has the qualities of ease of application to a writing surface, inherent stability that affords a long, satisfactory shelf life and avoidance of any "build-up" of ink on the external surface of the ball tip.

It is also a further object of the present invention to formulate an ink that may be easily manufactured in non-sealed mixing equipment.

DESCRIPTION OF THE ILLUSTRATIVE EMBODIMENTS

In this invention, a truly erasable writing medium has been obtained by uniquely combining selected materials in selected quantities, while eliminating or drastically limiting the presence of certain heretofore utilized materials, so as to produce a writing medium which can be successfully dispensed in a ballpoint pen and which is formulated and functions as described hereinbelow.

If a writing medium is to be truly erasable, the colorant content therein, after being dispensed onto the "written-upon" surface, must remain in such a location that it can be readily removed therefrom with a substantially non-abrasive eraser. Further, the colorant must not be allowed to affix itself either through chemical reaction or through ordinary physical attraction with any substantial degree of permanence to the "written-upon" surface. If these objectives are to be accomplished, the colorant content of the writing medium must be prevented from penetrating the pores of the substratum and must be shielded from intimate contact with the solid members of the writing surface. Further, if such a medium is to be dispensable from a ballpoint pen, it follows that the medium must possess physical characteristics which do not differ widely from those of ordinary ball pen inks.

The present invention does not require the use of any volatile solvent but relies on the use of an elastomeric polymer to prevent the colorant from penetrating into the surface of the writing paper. The erasability of the line produced from a ballpoint pen utilizing the inks of the present invention is accomplished by the choice of the elastomer and the vehicle and the critical amounts thereof.

The amounts of components can be varied; however, one must balance the detrimental effects and improvements which result from such variations. For example, a 20% decrease in the quantity of pigment will result in an ink having a less desirable color intensity but with improved erasability as there will be less color to be removed from the writing paper. Conversely, an increase in the pigment will yield an ink with increased color intensity but which requires more effort to completely remove the ink by erasing. Further, this increased effort to erase the mark made with an ink containing larger amounts of pigment may be partially compensated for by also increasing the amount of Cis-1.4 Polyisoprene. Although the present invention does not advocate or require the use of volatile solvents, which, as indicated earlier, are detrimental to the smooth writing quality, the inclusion of small quantities of a volatile material may be in some cases desirable provided the quantity is sufficiently limited so that decrease in writing quality is minimal.

The acceptable range of components for the present invention has been found to be as follows:

| Components | Selected Type | % by Weight |
|---|---|---|
| Elastomeric Polymer | Cis-1.4 Polyisoprene | 20–36 |
| Colorant | Pigment | 12–26 |
| Solvent or Plasticizer | Light Mineral Oil | 36–68 |
| Lubricants | Fatty Acids | 0–6 |
| Volatile Solvent | One compatible with Polyisoprene and having a boiling point less than 120° C. | 0–9 |

The Cis-1.4-Polyisoprene, the preferred elastomer, is selected to have a weight average molecular weight of 500,000 to 1,000,000. Polyisoprene lends itself as a suitable elastomer because it will dissolve in non-toxic solvents such as aliphatic oils and other solvents of a like nature. It should be recognized that other polymeric elastomers would serve to import erasability to a ballpoint pen ink, such as the epichlorohydrin elastomers mentioned in my prior Muller et al. patent and the alkyl vinyl ethers disclosed in the Daugherty et al. patent.

Examples of usable pigments include Victoria Blue, Alkali Blue, Lithol Red, graphite and carbon black. The suppliers of the listed usable pigments are as follows:

| Pigment | Supplier and Location |
|---|---|
| Victoria Blue | E. I. DuPont Wilmington, Delaware |
| Alkali Blue | Sherwin-Williams Co. Cleveland, Ohio |
| Lithol Red | Hilton Davis Cincinnati, Ohio |
| Graphite | Acheson Colloid Co. Port Huron, Michigan |
| Carbon Black | City Services Co. Tulsa, Oklahoma |

Other colors will, of course, require the use of other pigments and there is no intent to limit the pigments to those listed. The only requirements of the pigments are that they impart the desired color to the ink and that they are sufficiently fine to readily pass through the clearance between the ball and retaining lip of the ball point; i.e. approximately 5 microns or less.

The light mineral oil is one that has a boiling point between 180° C. and 290° C. and a viscosity around 1.5 centipoise which is sufficiently low as to result in final ink viscosity of between 1,000,000 and 4,000,000 centipoise. The typical boiling point usually is between 220° C. and 260° C. A typical example would be Penreco 2257 oil, a product of Penreco, headquartered in Butler Pennsylvania, a division of Pennzoil Company of Houston, Texas. Penreco 2257 oil has a viscosity of 1.5 centipoise at 20° C. and a boiling range of about 220° C. to 260° C. Another usable light mineral oil is Shell MSO, mineral seal oil, marketed by Shell Oil Company of Houston, Texas.

The lubricants are those usually included in ballpoint pen ink formulations and include fatty acids such as oleic, stearic and lauric acids.

Should it be found that a low boiling point solvent is desirable in a limited amount, a suitable example is Lacquer Diluent 6 supplied by Chem Central Company of Chicago, Ill. which has the property of being compatible with polyisoprene and has a boiling point between 94° C.–120° C.

The following examples are illustrative of a preferred embodiment but should not be construed in any way as limiting the present invention.

EXAMPLE 1—COLOR BLUE

| Components | Selected Type | % Amount by Weight |
|---|---|---|
| Elastomeric polymer | Cis-1.4 Polyisoprene | 27 |
| Colorant | Pigment (⅔ Alkali Blue, ⅓ Victoria Blue) | 15 |
| Solvent | Light Mineral Oil | 56 |
| Lubricant | Fatty Acids | 2 |

EXAMPLE 2—COLOR BLACK

| Components | Selected Type | % Amount by Weight |
|---|---|---|
| Elastomeric polymer | Cis-1.4 Polyisoprene | 25 |
| Colorant | Pigment (½ Carbon Black, ½ Victoria Blue) | 17 |
| Solvent | Light Mineral Oil | 56 |
| Lubricant | Fatty Acid | 2 |

EXAMPLE 3—COLOR RED

| Components | Selected Type | % Amount by Weight |
|---|---|---|
| Elastomeric polymer | Cis-1.4 Polyisoprene | 26 |
| Colorant | Pigment (Lithol Red) | 16 |
| Solvent | Light Mineral Oil | 56 |
| Lubricant | Fatty Acids | 2 |

The following example is illustrative of a formulation of the present invention wherein a limited amount of a low boiling volatile solvent is utilized:

EXAMPLE 4—COLOR BLUE

| Components | Selected Type | % Amount by Weight |
|---|---|---|
| Elastomeric polymer | Cis-1.4 Polyisoprene | 25 |
| Colorant | Pigment (⅔ Alkali Blue, ⅓ Victoria Blue) | 14 |
| Solvent | Light Mineral Oil | 51 |
| Lubricant | Fatty Acids | 2 |
| Volatile Solvent | Lacquer Diluent 6 | 8 |

The following example is illustrative of a formulation of the present invention wherein no lubricant is utilized:

EXAMPLE 5—COLOR BLUE

| Components | Selected Type | % Amount by Weight |
|---|---|---|
| Elastomeric polymer | Cis-1.4 Polyisoprene | 26 |
| Colorant | Pigment (⅓ Alkali Blue, ⅔ Victoria Blue) | 18 |
| Solvent | Light Mineral Oil | 56 |

The ballpoint pen inks of this invention are more viscous than the customary glycol based ballpoint pen inks and therefore are more suitable for use in a pressurized cartridge. The exact pressure required will be dependent upon the opening between the ball and lip of the point used, the viscosity range of the final ink composition, and the amount of ink and volume of the tube used to contain the ink.

It has been found that one desirable ink pressure medium is a mixture of nitrogen present in the amount of 90% or more by weight and an alkyl fluoride tracer gas such as Freon F-12 produced by E. I. DuPont of Wilmington, Delaware present in the amount of 10% or less by weight. The incorporation of a tracer gas makes it possible to detect a leaking cartridge by electronic means that detects the presence of the escaping tracer gas.

The pressurized cartridge utilizes a solid piston that is positioned on top of the ink supply and forwardly of the pressure producing medium. The follower has a central section that is cylindrical in shape and has its two ends formed as conical portions so that no specific orientation in assembly is required.

It is to be understood that the form of the invention herein above shown and described is to be taken as the preferred examples of the same, and that various changes in the components and the quantities thereof may be resorted to, without departing from the spirit of the invention or scope of the appended claims.

I claim:

1. In a ballpoint writing instrument containing a supply of ink capable of producing an intense colored line when deposited on a writing paper surface which line is capable of erasure within several hours after deposit by the use of a conventional pencil eraser without causing damage to the writing paper surface but which thereafter sets up to produce a permanent non-erasable line, said ink consisting essentially of an elastomeric polymer present in an amount between 20 and 36% by weight dissolved in an essentially non-volatile hydrocarbon solvent or plasticizer present in an amount between 36 and 68% by weight, said solvent or plasticizer being a light mineral oil having a viscosity at 20° C. of around 1.5 centipoises, being present in amount relative to said polymer such as to impart a final ink viscosity in the range $1\text{-}4 \times 10^6$ centipoises, and having a boiling point in the range 180°–290° C., and pigment particles present in the amount of 12 to 26% by weight evenly dispersed in the plasticized elastomer polymer solution, the pigment being present in amount relative to said polymer as to impart intensity while preserving the capability of initial erasure of said line.

2. A ballpoint writing instrument as defined in claim 1 wherein said elastomeric polymer is Cis-1.4-Polyisoprene.

3. A ballpoint writing instrument as defined in claim 1 wherein said pigment particle size is 5 microns or less.

4. A ballpoint writing instrument as defined in claim 1 wherein said ink contains a lubricant present in the amount of 6% or less by weight.

5. A ballpoint writing instrument as defined in claim 4 wherein said lubricant is a fatty acid.

6. A ballpoint writing instrument as defined in claim 1 wherein said ink contains a low boiling volatile solvent present in a limited amount of 9% or less by weight so that any decrease in writing quality is minimal.

7. A ballpoint writing instrument as defined in claim 6 wherein said low boiling volatile solvent is compatible with polyisoprene and has a boiling point of less than 120° C.

8. A ball point pen ink having a viscosity in the range $1\text{-}4 \times 10^6$ centipoises and which has the characteristics of erasability by conventional pencil eraser for several hours after application to a paper writing surface but which thereafter develops nonerasable properties, which ink comprises about 20–36% by weight of an elastomeric polymer having a molecular weight in the range 500,000–1,000,000, about 36–68% by weight of a solvent or plasticizer for said polymer having a viscosity at 20° C. of around 1.5 centipoises, said solvent or plasticizer being a light mineral oil having a boiling point in the range of 180°–290° C., about 12 to 26% by weight of particulate pigment having a particle size of 5 microns or less, up to but not more than 9% by weight of a volatile solvent for the polymer, and up to about 6% by weight of fatty acid lubricant.

9. A ball point pen ink as defined in claim 8 wherein said polymer is a Cis-1.4 Polyisoprene.

* * * * *